(12) United States Patent
Lee

(10) Patent No.: US 11,945,426 B2
(45) Date of Patent: Apr. 2, 2024

(54) BRAKE CONTROL APPARATUS AND METHOD OF CONTROLLING THE SAME

(71) Applicant: HL MANDO CORPORATION, Gyeonggi-do (KR)

(72) Inventor: Changyoung Lee, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 515 days.

(21) Appl. No.: 17/226,084

(22) Filed: Apr. 9, 2021

(65) Prior Publication Data
US 2021/0323516 A1    Oct. 21, 2021

(30) Foreign Application Priority Data
Apr. 16, 2020 (KR) .......................... 10-2020-0046032

(51) Int. Cl.
*B60T 8/17* (2006.01)
*B60T 8/171* (2006.01)
*B60T 13/68* (2006.01)

(52) U.S. Cl.
CPC .............. *B60T 8/17* (2013.01); *B60T 8/171* (2013.01); *B60T 13/686* (2013.01); *B60T 2201/03* (2013.01); *B60T 2201/06* (2013.01); *B60T 2220/04* (2013.01); *B60T 2250/00* (2013.01); *B60T 2270/89* (2013.01)

(58) Field of Classification Search
CPC .......... B60T 8/17; B60T 13/686; B60T 8/171; B60T 2201/06; B60T 2220/04; B60T 2270/89; B60T 2201/03; B60T 2250/00; B60T 13/745; B60T 7/042; B60T 2260/04
See application file for complete search history.

(56) References Cited

U.S. PATENT DOCUMENTS

2018/0194332 A1*  7/2018  Watanabe ................. B60T 7/12

FOREIGN PATENT DOCUMENTS

| JP | 2711753 | 10/1997 |
|---|---|---|
| JP | 2002-283981 | 10/2002 |

OTHER PUBLICATIONS

Japanese Patent No. JP 2013537144 published on Sep. 30, 2013.*

* cited by examiner

*Primary Examiner* — Pamela Rodriguez
(74) *Attorney, Agent, or Firm* — Ladas & Parry, LLP

(57) ABSTRACT

A brake control apparatus includes a hydraulic pressure supply device configured to provide a hydraulic pressure to a wheel cylinder of a vehicle; a flow path extending from the hydraulic pressure supply device to the wheel cylinder; at least one valve configured to open or close the flow path; and a controller electrically connected to the hydraulic pressure supply device and the at least one valve. The controller may be configured to control the hydraulic pressure supply device to supply the hydraulic pressure to the wheel cylinder through the flow path, and in response to a change in a gear position of a transmission of the vehicle, to control at least one of the hydraulic pressure supply device and the at least one valve to maintain a hydraulic pressure of the wheel cylinder or a hydraulic pressure of the flow path for a first reference time after the change in the gear position.

20 Claims, 9 Drawing Sheets

BRAKE CONTROL APPARATUS AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0046032, filed on Apr. 16, 2020, the disclosure of which is incorporated herein by reference.

BACKGROUND

1. Field

The disclosure relates to a brake control apparatus and a method of controlling the same, and more particularly, to a brake control apparatus that operates in conjunction with a transmission and a method of controlling the same.

2. Description of Related Art

Vehicles are essentially equipped with a brake control apparatus for performing braking, and various types of brake control apparatuses have been proposed for a safety of drivers and passengers.

In order to assist the driver's braking operation, a conventional brake control apparatus may brake the vehicle or maintain the vehicle's braking in conjunction with an engine and a transmission. For example, when the vehicle is on an inclined road and a position of a shift lever is a driving position (D), the brake control apparatus may maintain the braking of the vehicle even if the driver released his or her foot from a brake pedal for driving the vehicle.

However, various types of transmissions are currently being developed, and a delay time for changing a position of a gear is different depending on the type of transmission. Since the delay time of the transmission is different as described above, there is a fear that a malfunction may occur in an operation in conjunction with the transmission of the brake control apparatus.

SUMMARY

An aspect of the disclosure is to provide a brake control apparatus capable of braking a vehicle or maintaining a braking regardless of a response speed of a transmission, and a method of controlling the brake control apparatus.

An object of the present invention is to provide a brake control apparatus capable of braking maintaining the braking of the vehicle for a predetermined time in response to a change in a position of a transmission gear, and a method of controlling the brake control apparatus.

Additional aspects of the disclosure will be set forth in part in the description which follows and, in part, will be obvious from the description, or may be learned by practice of the disclosure.

According to an aspect of the disclosure, there is provided a brake control apparatus including: a hydraulic pressure supply device configured to provide a hydraulic pressure to a wheel cylinder of a vehicle; a flow path extending from the hydraulic pressure supply device to the wheel cylinder; at least one valve configured to open or close the flow path; and a controller electrically connected to the hydraulic pressure supply device and the at least one valve. The controller may be configured to control the hydraulic pressure supply device to supply the hydraulic pressure to the wheel cylinder through the flow path, and in response to a change in a gear position of a transmission of the vehicle, to control at least one of the hydraulic pressure supply device and the at least one valve to maintain a hydraulic pressure of the wheel cylinder or a hydraulic pressure of the flow path for a first reference time after the change in the gear position.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
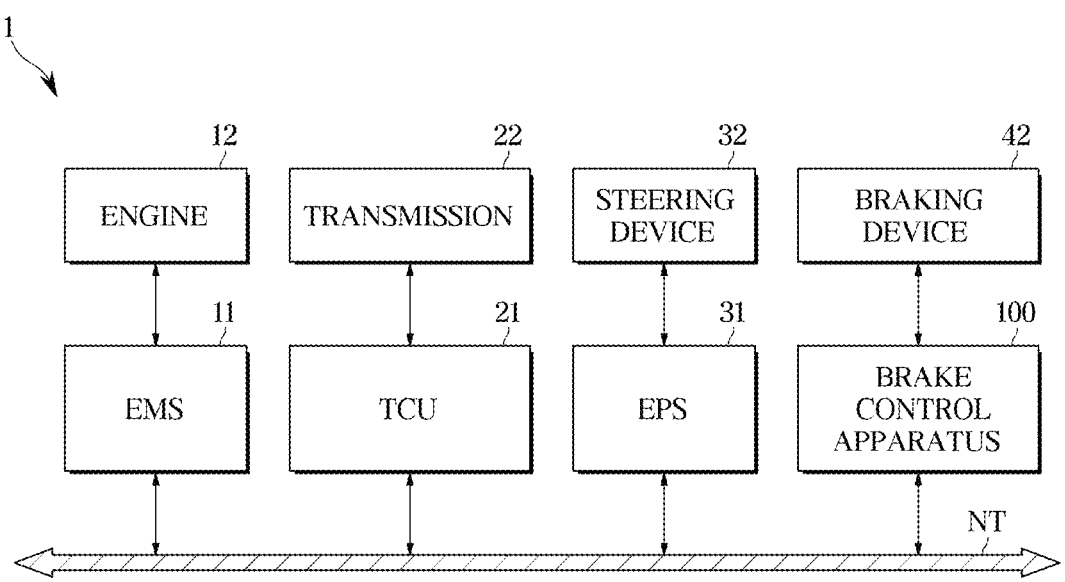
FIG. 1 is a view illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the disclosure will be described with reference to accompanying drawings.

FIG. 1 is a view illustrating a configuration of a vehicle according to an embodiment.

Referring to FIG. 1, a vehicle 1 may include an engine 12 and a transmission 22 for rotating a wheel so that the vehicle 1 moves, a steering device 32 for changing a direction of a rotation axis of the wheel to change a moving direction of the vehicle 1, a braking device 42 for stopping a rotation of the wheel so that the vehicle 1 stops. In addition, the vehicle 1 may include an engine management system (EMS) 11 for controlling the engine 12, a transmission control unit (TCU) 21 for controlling the transmission 22, an electronic power steering control module (EPS) 41 for controlling the steering device 32, and a brake control apparatus 100 for controlling the braking device 42.

The brake control apparatus 100 may control the braking device 42 in response to a driver's braking intent and/or a behavior of the vehicle 1 through a brake pedal.

The brake control apparatus 100 may supply a hydraulic pressure to a wheel cylinder in response to the driver's braking intent through the brake pedal. For example, the brake control apparatus 100 may perform an anti-lock brake system (ABS), an electronic stability control (ECS), or a traction control system (TCS).

In this way, electric components included in the vehicle 1 may communicate with each other through a vehicle communication network NT. For example, the TCU 21 may transmit a position of a shift lever and a gear position of the transmission 22 through the communication network NT.

The brake control apparatus 100 may control the braking device 42 by receiving data from the EMS 11, the TCU 21 and the EPS 31 through the communication network NT, and processing the received data. For example, when the vehicle 1 is stopped on an inclined road and the gear position of the transmission 22 is a driving position D, the brake control apparatus 100 may control the braking device 42 to still brake the vehicle 1 (Hereinafter referred to as hill start assist (HSA)) even if the brake pedal moves to a reference position (a position of the brake pedal when the driver releases his or her foot from the brake pedal).

Figure 2:
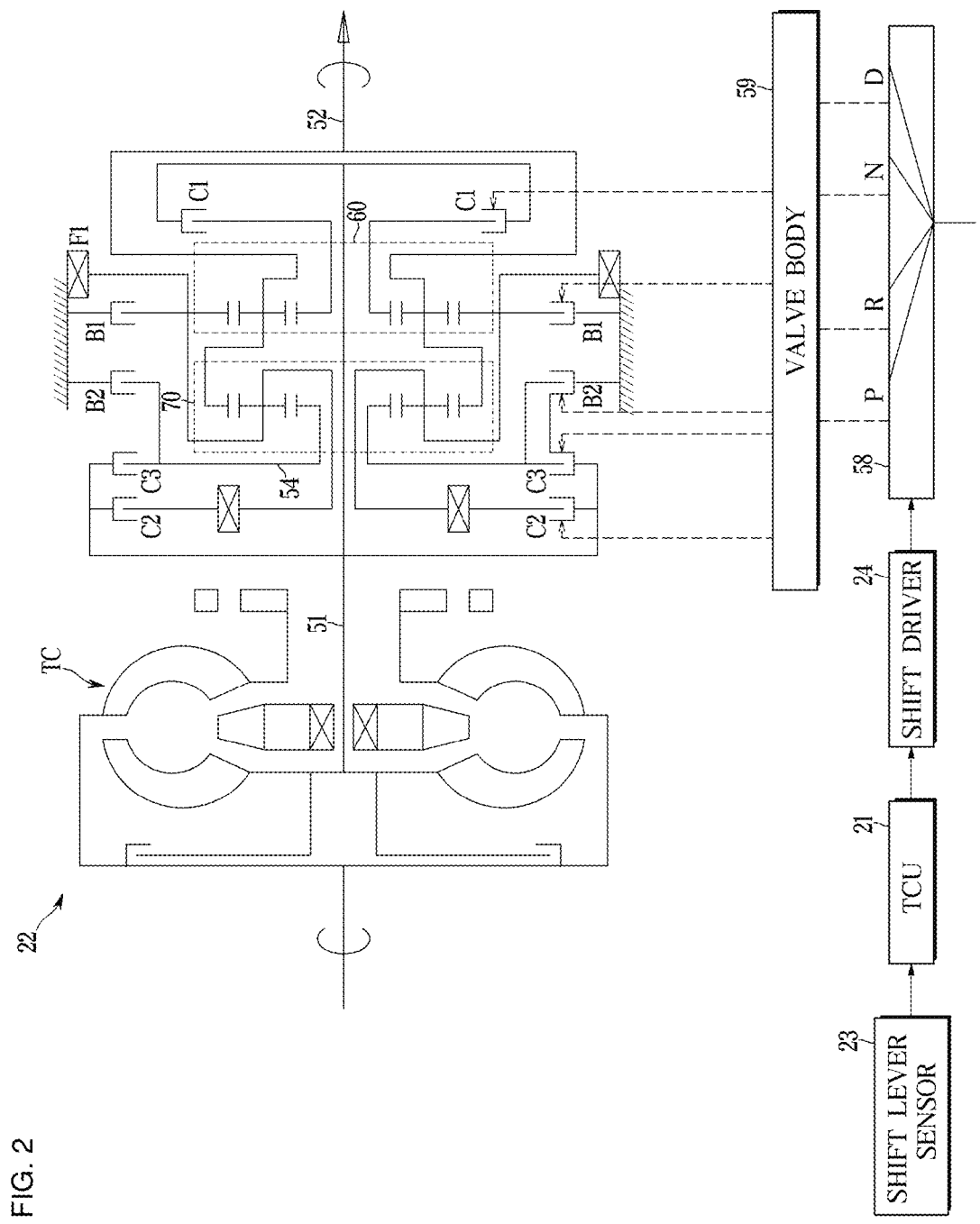
FIG. 2 is a view illustrating a transmission and a transmission control unit (TCU) included in a vehicle according to an embodiment.

FIG. 2 is a view illustrating a transmission and a transmission control unit (TCU) included in a vehicle according to an embodiment.

Referring to FIG. 2, the transmission 22 may include an input shaft 51 and an output shaft 52 disposed coaxially with first and second single pinion planetary gear sets 60 and 70.

A first clutch C1 may be disposed on an output shaft 52 side, a second clutch C2 may be disposed on a torque converter TC side, and a third clutch C3 may be disposed between the second clutch C2 and a single pinion planetary gear set 54. Depending on the position of the shift lever, operations of the first, second and third clutches C1, C2, and C3 and first and second brakes B1 and B2 may be controlled, thereby controlling an output of the transmission 22 may be controlled.

The transmission 22 may further include a manual valve 58 and a valve body 59 for controlling the operations of the first, second and third clutches C1, C2, and C3 and the first and second brakes B1 and B2. It includes more.

The manual valve 58 may include an inlet IN, a parking outlet P, a reverse outlet R, a neutral outlet N, and a drive outlet D. The hydraulic pressure may be provided to the manual valve 58 through the inlet IN.

The manual valve 58 may be moved to a reverse position R, a neutral position N/parking position P, and the driving position D according to an operation of the driver's shift lever. In a case of the manual valve 58 operated by R-P/N-D, the neutral position N and the parking position P are in the same position, but the detent lever linked to the manual valve 58 operates as P-R-N-D, so that the manual valve 58 moves from the parking position P to the neutral position N through the reverse position R.

Depending on a position of the manual valve 58, at least one of the parking outlet P, the reverse outlet R, the neutral outlet N, and the driving outlet D may be opened.

The valve body 59 may include a plurality of flow paths and a plurality of valves, and may properly guide the hydraulic pressure discharged from the outlets P, R, N, D of the manual valve 58 to first, second, and third clutches C1, C2, and C3 and the first and second brakes B1 and B2.

A shift lever sensor 23 for detecting the position of the shift lever may be provided. The shift lever sensor 23 may detect the position of the shift lever by the operation of the driver, and provide information about the position of the shift lever to the TCU 21.

A shift driver 24 for driving the manual valve 58 and the valve body 59 may be provided. The shift driver 24 may receive a shift control signal from the TCU 21 and change the position of the manual valve 58 in response to the shift control signal.

A time delay may occur between the shift by a movement of the shift lever and a movement of the shift lever. In other words, a response delay may occur in the shift caused by the movement of the shift lever.

The TCU 21 may receive information about the position of the shift lever from the shift lever sensor 23, process the information about the position of the shift lever, and control the shift driver 24 to move the manual valve 58.

In addition, the TCU 21 may transmit the information about the position of the shift lever received from the shift lever sensor 23 to another electronic component (for example, the brake control apparatus) of the vehicle 1 through the communication network NT.

Figure 3:
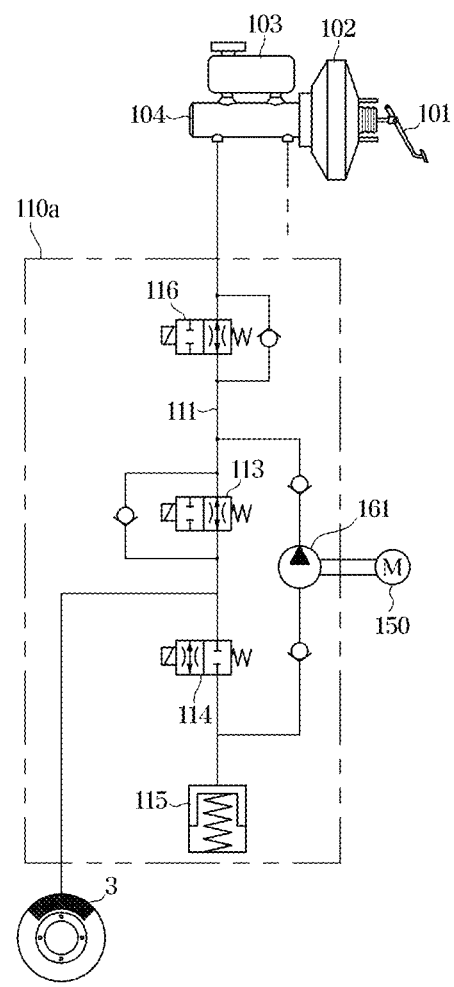
FIG. 3 is a view illustrating an example of a brake control apparatus according to an embodiment.

FIG. 3 is a view illustrating an example of a brake control apparatus according to an embodiment.

Referring to FIG. 3, the brake control apparatus 100 may include a brake pedal 101 for receiving the driver's braking intent, a brake booster 102 that doubles a pedal effort of the brake pedal 101 by using a pressure difference between a vacuum pressure and an atmospheric pressure, a reservoir 103 for storing brake oil, a master cylinder 104 for generating the hydraulic pressure by the brake booster 102, and a hydraulic circuit 110a for connecting the master cylinder 20 to a wheel cylinder 3.

The hydraulic circuit 110a may connect the master cylinder 104 to the wheel cylinder 3 and may transmit or block the hydraulic pressure generated by the master cylinder 104 to the wheel cylinder 3.

The hydraulic circuit 110a may include a main flow path 111 connecting the master cylinder 104 to the wheel cylinder 3, and may further include an inlet valve 113, an outlet valve 114, and a low pressure accumulator 115 provided on the main flow path 111.

The inlet valve 113 may be disposed on a flow path connecting the master cylinder 104 with the wheel cylinder 3. The inlet valve 113 may control the hydraulic pressure transmitted from the master cylinder 104 to the wheel cylinder 3. The inlet valve 113 may be a normal open solenoid valve.

The outlet valve 114 may be disposed on a flow path connecting the wheel cylinder 3 with the low pressure accumulator 115. The outlet valve 114 may control hydraulic pressure discharged from the wheel cylinder 3. The outlet valve 114 may be a normal close solenoid valve.

The low pressure accumulator 115 may temporarily store the brake oil discharged from the wheel cylinder 3.

The hydraulic circuit 110a may further include a traction control valve 116 (hereinafter referred to as a "TC valve") provided on the main flow path 111.

The hydraulic circuit 110a may further include a first hydraulic pressure supply device 161 and a drive motor 150 for driving the first hydraulic pressure supply device 161. An outlet of the first hydraulic pressure supply device 161 may be connected to the inlet valve 113, and the first hydraulic pressure supply device 161 may pump the brake oil stored in the low pressure accumulator 115 to the wheel cylinder 3 through the inlet valve 113 while the TC valve 116 is closed.

When the driver depresses the brake pedal 101, the brake booster 102 may amplify the pedal effort of the brake pedal 101 and transmit it to the master cylinder 104. The master cylinder 104 may provide the hydraulic pressure to the wheel cylinder 3 through the inlet valve 113 with the inlet valve 113 open and the TC valve 116 open.

To provide the HSA, the brake control apparatus 100 may close the inlet valve 113 and maintain the hydraulic pressure of the wheel cylinder 3. Thereby, even if the driver releases his or her foot from the brake pedal 101, the braking of the vehicle 1 may be maintained.

Figure 4:
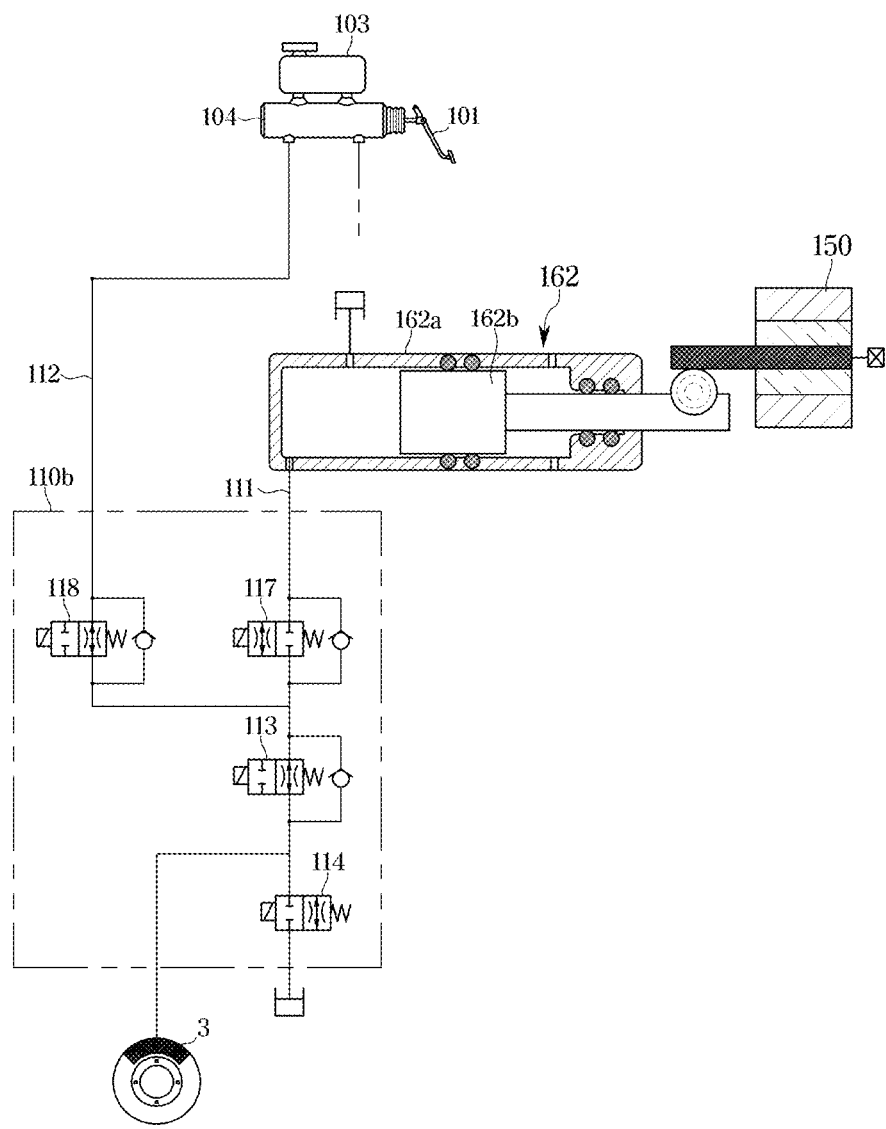
FIG. 4 is a view illustrating an example of a brake control apparatus according to an embodiment.

FIG. 4 is a view illustrating an example of a brake control apparatus according to an embodiment.

Referring to FIG. 4, the brake control apparatus 100 may include the brake pedal 101 for receiving the driver's braking intent, the reservoir 103 for storing the brake oil, the master cylinder 104 for generating the hydraulic pressure by the movement of the brake pedal 101, a second hydraulic pressure supply device 162 for generating the hydraulic pressure in response to the movement of the brake pedal 101, the drive motor 150 for driving the second hydraulic pressure supply device 162, and a hydraulic circuit 110b connecting the master cylinder 104 and/or the second hydraulic pressure supply device 162 to the wheel cylinder 3.

The second hydraulic pressure supply device 162 may include a cylinder 162a and a piston 162b, and may generate the hydraulic pressure by a movement of the piston 162b in response to the movement of the brake pedal 101. A brake pedal sensor for detecting the movement of the brake pedal 101 may be provided, and the piston 162b of the second hydraulic pressure supply device 162 may move in response to the brake pedal sensor.

The drive motor 150 may generate a rotational force for moving the piston 162b. The rotational force of the drive motor 150 may be converted into a reciprocating force by a power transmission device (e.g., a plurality of gears), and the piston 162b may reciprocate by the converted reciprocating force.

The hydraulic circuit 110b may connect the second hydraulic pressure supply device 162 to the wheel cylinder 3, and may transmit or block the hydraulic pressure generated from at least one of the second hydraulic pressure supply devices 162 to the wheel cylinder 3.

The hydraulic circuit 110b may include the main flow path 111 for connecting the second hydraulic pressure supply device 162 to the wheel cylinder 3, and may further include a first cut valve 117, the inlet valve 113, and the outlet valve 114 provided on the main flow path 111.

The first cut valve 117 may allow to provide the hydraulic pressure generated by the second hydraulic pressure supply device 162 to the wheel cylinder 3 in an open state.

The hydraulic circuit 110b may further include an auxiliary flow path 112 connecting the master cylinder 104 to the wheel cylinder 3 and a second cut valve 118 provided on the auxiliary flow path 112.

When the driver depresses the brake pedal 101, the second hydraulic pressure supply device 162 may provide the hydraulic pressure to the wheel cylinder 3 through the inlet valve 113 in a state in which the inlet valve 113 is opened and the first cut valve 117 is opened.

In addition, to provide the HSA, the brake control apparatus 100 may close the inlet valve 113 and maintain the hydraulic pressure of the wheel cylinder 3.

Figure 5:
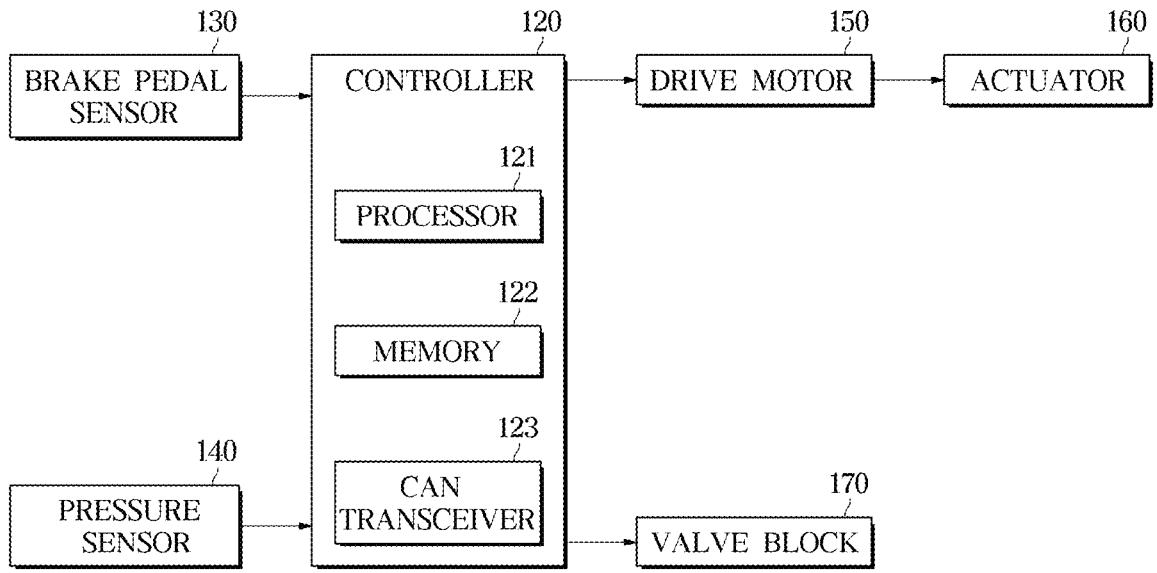
FIG. 5 is a view illustrating a configuration of a brake control apparatus according to an embodiment.
Figure 6A:
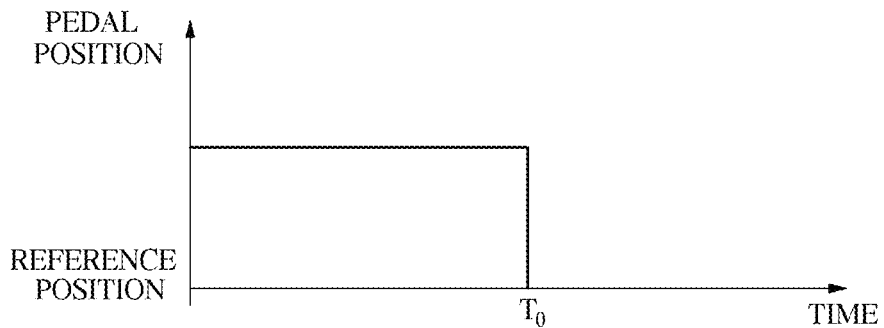
FIGS. 6A and 6B are views illustrating a hydraulic pressure of a hydraulic circuit by a hill start assist (HSA) operation of a brake control apparatus according to an embodiment.
Figure 6B:
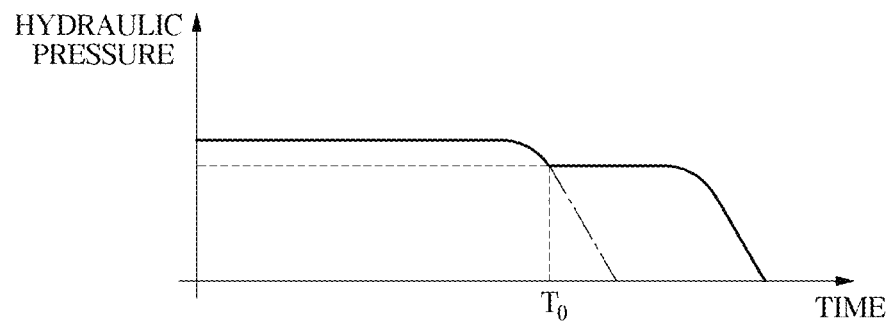
Figure 7:
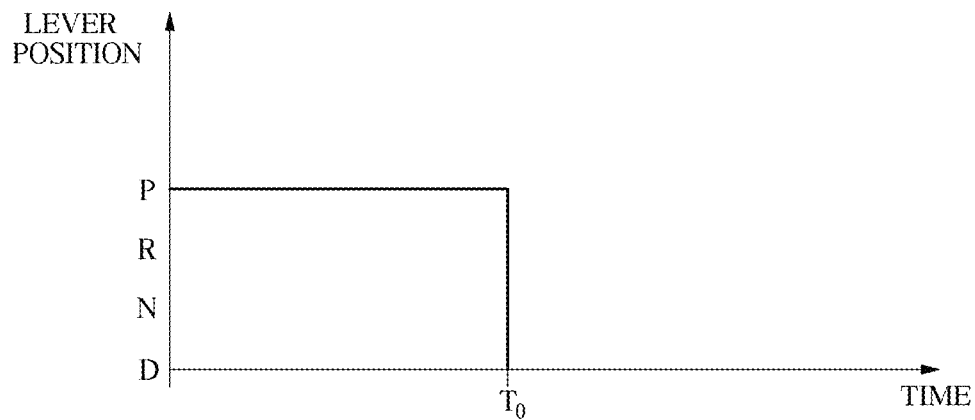
FIG. 7 is a view illustrating a change in a lever position of transmission included in a vehicle according to an embodiment.
Figure 8:
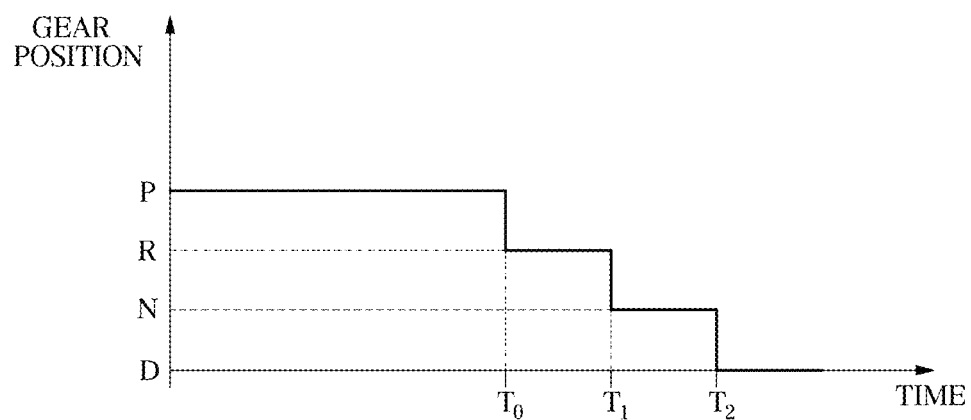
FIG. 8 is a view illustrating a change in a transmission gear position included in a vehicle according to an embodiment.
Figure 9:
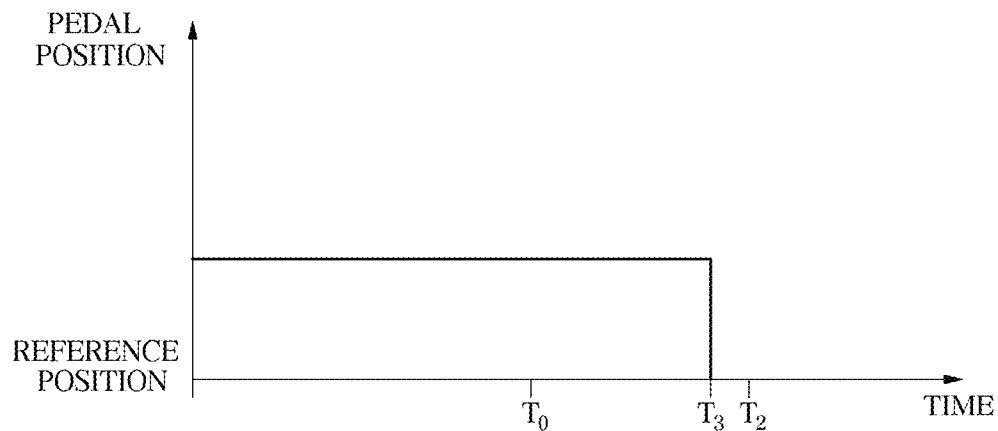
FIG. 9 is a view illustrating a change in a position of a brake pedal during a change in a gear position.
Figure 10:
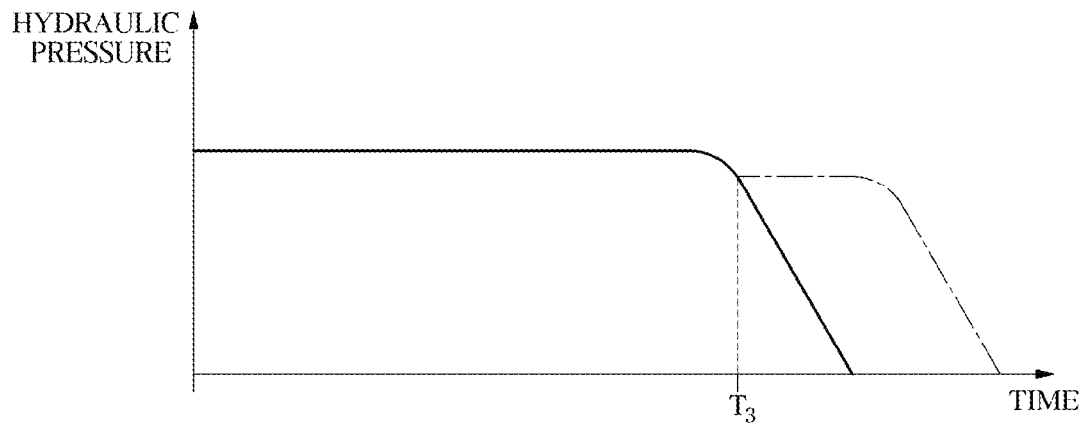
FIG. 10 is a view illustrating a hydraulic pressure in a hydraulic circuit by a hill start assist (HSA) operation of a prior art during a change in a gear position.
Figure 11:
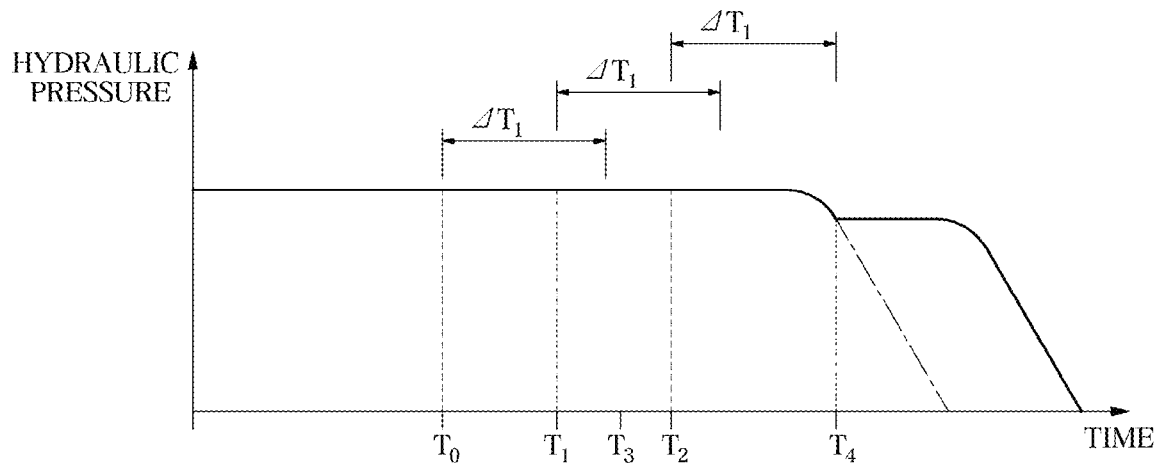
FIGS. 11 and 12 are views illustrating a hydraulic pressure in a hydraulic circuit by a hill start assist (HSA) operation of an embodiment during a change in a gear position.
Figure 12:
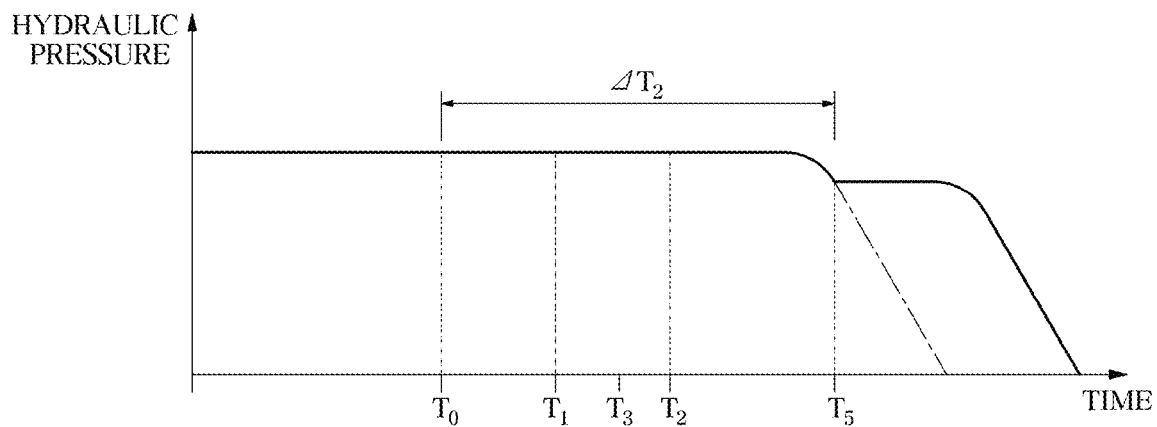

FIG. 5 is a view illustrating a configuration of a brake control apparatus according to an embodiment. FIGS. 6A and 6B are views illustrating a hydraulic pressure of a hydraulic circuit by a hill start assist (HSA) operation of a brake control apparatus according to an embodiment. FIG. 7 is a view illustrating a change in a lever position of transmission included in a vehicle according to an embodiment. FIG. 8 is a view illustrating a change in a transmission gear position included in a vehicle according to an embodiment. FIG. 9 is a view illustrating a change in a position of a brake pedal during a change in a gear position. FIG. 10 is a view illustrating a hydraulic pressure in a hydraulic circuit by a hill start assist (HSA) operation of a prior art during a change in a gear position. FIGS. 11 and 12 are views illustrating a hydraulic pressure in a hydraulic circuit by a hill start assist (HSA) operation of an embodiment during a change in a gear position.

Referring to FIG. 5, the brake control apparatus 100 may include a brake pedal sensor 130 for detecting the movement of the brake pedal 101, a pressure sensor 140 for detecting a pressure in the hydraulic circuits 110a and 110b, an actuator 160 for supplying the hydraulic pressure to the wheel cylinder 3, the drive motor 150 for driving the actuator 160, a valve block 170 for opening or closing a flow path for guiding the hydraulic pressure generated by the actuator 160 to the wheel cylinder 3, and a controller 120 for controlling the operation of the brake control apparatus 100.

The brake pedal sensor 130 may detect a moving distance and/or a moving speed at which the brake pedal 101 moves according to the driver's braking intent, and may provide an electrical output signal (pedal signal) depending on the detected moving distance and/or moving speed to the controller 120. The controller 120 may determine the driver's braking intent based on a pedal signal of the brake pedal sensor 130.

The pressure sensor 140 may be provided on the hydraulic circuits 110a and 110b that provide the hydraulic pressure to the wheel cylinder 3 and may detect the hydraulic pressure of a pressurized medium on the hydraulic circuits 110a and 110b. The pressure sensor 140 may provide the electrical output signal (pressure signal) depending on the detected hydraulic pressure to the controller 120.

The actuator 160 may generate the hydraulic pressure by receiving the rotational force from the drive motor 150. The actuator 160 may include, for example, the first hydraulic pressure supply device 161 illustrated in FIG. 3 or the second hydraulic pressure supply device 162 illustrated in FIG. 4.

The drive motor 150 may generate the rotational force in response to a drive signal from the controller 120. The rotational force generated by the drive motor 150 may be provided to the actuator 160.

The valve block 170 may include the plurality of valves of the brake control apparatus 100. For example, the valve block 170 may include the inlet valve 113, the outlet valve 114, and the TC valve 116 illustrated in FIG. 3. In addition, the valve block 170 may include the inlet valve 113, the outlet valve 114, the first cut valve 117, and the second cut valve 118 illustrated in FIG. 4.

The controller 120 may receive the output signal (pedal signal) of the brake pedal sensor 130 and the output signal (pressure signal) of the pressure sensor 140, process the received signal to control the drive motor 150 and the valve block 170.

The controller 120 may include a plurality of semiconductor devices, and may be variously referred to, such as an electronic control unit (ECU). The controller 120 may include a CAN transceiver 123, a memory 122, and a processor 121. The controller 120 may include a plurality of processors and/or a plurality of memories.

The CAN transceiver 123 may receive a communication signal from the TCU 21 through the vehicle communication network NT and transmit the communication signal to the TCU 21. For example, the CAN transceiver 123 may receive the communication signal indicating the position of the shift lever and/or the gear position of the transmission 22 from the TCU 21.

The memory 122 may store/store programs and data for braking the vehicle 1 depending on the driver's braking intent. The memory 122 provides the programs and data to the processor 121 and may store temporary data generated during an operation of the processor 121.

The memory 122 may include a volatile memory and a non-volatile memory. The memory 122 may include one semiconductor device or may include a plurality of semiconductor devices.

The processor 121 may receive the pedal signal of the brake pedal sensor 130 and the pressure signal of the pressure sensor 140 according to the programs and data provided from the memory 122, and may provide the control signal to the drive motor 150 and the valve block 170 by processing the received signal. For example, the processor 121 may provide the drive signal for generating the hydraulic pressure to the drive motor 150, and may provide an open/close signal for guiding the hydraulic pressure from the actuator 160 to the wheel cylinder 3 to the valve block 170.

The processor 121 may receive the gear position of the transmission 22 through the vehicle communication network NT according to the programs and data provided from the memory 122, determine a change in the gear position, and determine the control signal to the drive motor 150 and the valve block 170. For example, when the gear position is changed from the parking position P to the driving position D and the position of the brake pedal 101 is changed to the reference position, the processor 121 may provide control signals to the drive motor 150 and the valve block 170 to maintain the hydraulic pressure of the wheel cylinder 3 and the hydraulic circuits 110a and 110b.

As such, when the gear position is changed from the parking position P to the driving position D and the position of the brake pedal 101 is changed to the reference position, the controller 120 may control the drive motor 150 and/or the valve block 170 to maintain the braking of the vehicle 1.

In addition, the controller 120 may perform an HSA operation.

When the vehicle 1 is stopped on the inclined road and the gear position of the transmission 22 is the driving position D and the brake pedal moves to the reference position, the controller 12—may control the drive motor 150 and/or the valve block 170 to maintain the braking of the vehicle 1.

For example, the controller 120 may receive the pedal signal for moving the brake pedal to the reference position at a time T0 from the brake pedal sensor 130. The controller 120 may determine whether the vehicle 1 is located on the inclined road by processing an output of a gravity sensor. The controller 120 may receive the gear position of the transmission 22 through the vehicle communication network NT.

As illustrated in FIG. 6A, the vehicle 1 may determine that the vehicle 1 stops on the inclined road at the time T0, and the gear position of the transmission 22 is the driving position D, and the pedal position of the brake pedal is the reference position.

The controller 120 may control the drive motor 150 and the valve block 170 to maintain the hydraulic pressure of the wheel cylinder 3 and the hydraulic circuits 110a and 110b, as illustrated in FIG. 6B. For example, the controller 120 may close the inlet valve 113 and the outlet valve 114 to maintain the braking of the vehicle 1. As another example, the controller 120 may control the drive motor 150 to close the outlet valve 114 and maintain the hydraulic pressure of the hydraulic circuits 110a and 110b.

At this time, the HSA operation may not be performed due to the response delay of the transmission 22.

For example, the driver may move the brake pedal 101 to change the position of the shift lever. Thereafter, as illustrated in FIG. 7, the driver may move the shift lever from the parking position P to the driving position D at the time T0, and may take off his foot from the brake pedal 101 for the driving.

By moving the shift lever from the parking position P to the driving position D, the gear position of the transmission 22 as illustrated in FIG. 8 may be changed from the parking position P to the reverse position R at the time T0, from the reverse position R to the neutral position N at a time T1, and from the neutral position N to the driving position D at a time T2.

The brake control apparatus 100 may determine whether the vehicle 1 is located on the inclined road by obtaining the output of the gravity sensor and processing the output of the gravity sensor. The brake control apparatus 100 may perform the HSA when the vehicle 1 is located on the inclined road, the gear position is the driving position D, and the brake pedal 101 is located at the reference position.

However, when the gear position change of the transmission 22 is delayed, the HSA operation may not be performed.

For example, as illustrated in FIG. 9, the controller 120 may receive the pedal signal for moving the brake pedal to the reference position at a time T3 from the brake pedal sensor 130.

At this time, the time T3 may be a time between T0 when the gear position moves from the parking position P to the reverse position R and T2 when the gear position moves from the neutral position N to the driving position D. In other words, when the driver releases his or her foot from the brake pedal 101, that is, when the brake pedal moves to the reference position, the gear position of the transmission 22 may be the reverse position R or the neutral position D.

Accordingly, as illustrated in FIG. 10, the controller 120 may reduce the hydraulic pressure of the wheel cylinder 3 and the hydraulic circuits 110a and 110b without performing the HSA operation. A braking force of the vehicle 1 decreases, and the vehicle 1 on the inclined road may move due to gravity.

In order to prevent the movement of the vehicle 1 due to the delay in the change in the gear position as described above, the controller 120 may maintain the hydraulic pressure of the wheel cylinder 3 for a predetermined first reference time in response to the change in the gear position of the transmission 22.

For example, the controller 120 may receive a message from the TCU 21 indicating that the gear position of the transmission 22 has changed from the parking position P to the reverse position R while providing the hydraulic pressure to the wheel cylinder 3. When receiving the message of the change in the gear position, the controller 120 may control the drive motor 150 and/or the valve block 170 to maintain the hydraulic pressure of the wheel cylinder 3 or the hydraulic circuits 110a and 110b for the first reference time after receiving the message. For example, the controller 120 may control the valve block 170 to close the inlet valve 113 and the outlet valve 114 to maintain the hydraulic pressure of the wheel cylinder 3 for the first reference time. As another example, the controller 120 may control the valve block 170 to close the outlet valve 114 and control the drive motor 150 to maintain hydraulic pressure.

Here, the first reference time may be similar to or longer than the delay time for changing the gear position of the transmission 22.

The controller 120 may receive a message from the TCU 21 indicating that the gear position of the transmission 22 has changed from the reverse position R to the neutral position N while maintaining the hydraulic pressure of the wheel cylinder 3. Upon receiving the message of the change in the gear position, the controller 120 may control the drive motor 150 and/or the valve block 170 to maintain the hydraulic pressure of the wheel cylinder 3 or the hydraulic circuits 110a and 110b for the first reference time after the gear position is changed to the neutral position N.

In addition, the controller 120 may receive a message from the TCU 21 indicating that the gear position of the transmission 22 has changed from the neutral position N to the driving position D while maintaining the hydraulic pressure of the wheel cylinder 3. Upon receiving the message of the change in the gear position, the controller 120 may control the drive motor 150 and/or the valve block 170 to maintain the hydraulic pressure of the wheel cylinder 3 or the hydraulic circuits 110a and 110b for the first reference time after the gear position is changed to the driving position D.

When the brake pedal 101 is located at the reference position after the first reference time elapses after the gear position is changed to the driving position D, the controller 120 may control the drive motor 150 and/or the valve block 170 to discharge the hydraulic pressure of the wheel cylinder 3 or the hydraulic circuits 110a and 110b.

For example, as illustrated in FIG. 11, when receiving the message indicating that the gear position has been changed, the controller 120 may control the drive motor 150 and/or the valve block 170 to maintain the hydraulic pressure of the wheel cylinder 3 or the hydraulic circuits 110a and 110b for a first reference time $\Delta T1$. In addition, when receiving the message indicating that the gear position has changed, the controller 120 may postpone performing the HSA operation.

Accordingly, at a time T4 at which the first reference time $\Delta T1$ has elapsed from T2 when the gear position is changed from the neutral position N to the driving position D, the controller 120 may determine whether to perform the HSA operation. At the time T4, the controller 120 may determine that the vehicle 1 is stopped on the inclined road, the gear position of the transmission 22 is the driving position D and the brake pedal is located at the reference position.

In addition, in order to prevent the movement of the vehicle 1 due to the delay in the change in the gear position described above, the controller 120 may maintain the hydraulic pressure of the wheel cylinder 3 for a predetermined second time in response to the change in the position of the shift lever.

For example, when the shift lever moves from the parking position P to the driving position D, the controller 120 may control the drive motor 150 and/or the valve block 170 to maintain the hydraulic pressure of the wheel cylinder 3 or the hydraulic circuits 110a and 110b for the second reference time after receiving the message.

Here, the second reference time may be similar to or longer than the delay time for changing the gear position of the transmission 22 from the parking position P to the driving position D.

When the brake pedal 101 is located at the reference position after the second reference time elapses after the lever position is changed to the driving position D, the controller 120 may control the drive motor 150 and/or the valve block 170 to discharge the hydraulic pressure of the wheel cylinder 3 or the hydraulic circuits 110a and 110b.

For example, as illustrated in FIG. 12, when receiving the message indicating that the lever position has been changed, the controller 120 may control the drive motor 150 and/or the valve block 170 to maintain the hydraulic pressure of the wheel cylinder 3 or the hydraulic circuits 110a and 110b for a second reference time $\Delta T2$. In addition, when receiving the message indicating that the lever position has changed, the controller 120 may postpone performing the HSA operation.

Accordingly, at a time T5 at which the second reference time $\Delta T2$ has elapsed from T0 when the lever position is changed from the parking position P to the driving position D, the controller 120 may determine whether to perform the HSA operation. At the time T5, the controller 120 may determine that the vehicle 1 is stopped on the inclined road, the gear position of the transmission 22 is the driving position D and the brake pedal is located at the reference position.

The brake control apparatus 100 may perform the HSA. For example, the controller 120 may control the drive motor 150 and/or the valve block 170 to maintain the hydraulic pressure of the wheel cylinder 3 or the hydraulic circuits 110a and 110b for a predetermined third reference time.

Thereby, despite the shift delay of the transmission 22, the brake control apparatus 100 of the vehicle 1 may perform the HSA without malfunction.

Figure 13:
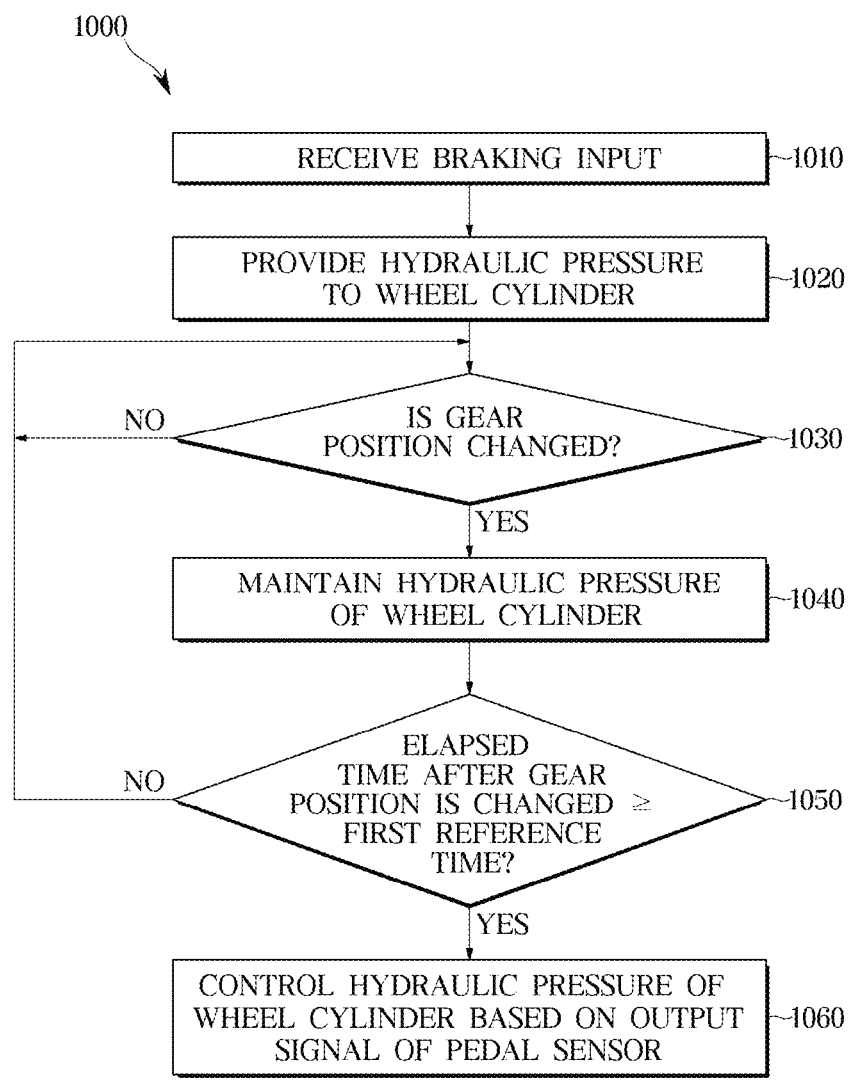
FIG. 13 is a view illustrating a transmission delay compensation operation of a brake control apparatus according to an embodiment.

FIG. 13 is a view illustrating a transmission delay compensation operation of a brake control apparatus according to an embodiment.

Referring to FIG. 13, a transmission delay compensation operation 1000 of the brake control apparatus 100 will be described.

The brake control apparatus 100 may receive a braking input from the driver (1010).

The brake control apparatus 100 may obtain the braking input (braking intent) of the driver through the brake pedal 101. The controller 120 may determine that the brake pedal 101 deviates from the reference position.

The brake control apparatus 100 may provide the hydraulic pressure to the wheel cylinder 3 (1020).

For example, the master cylinder 104 may generate the hydraulic pressure, and the hydraulic pressure generated by the master cylinder 104 may be provided to the wheel cylinder 3 via the inlet valve 113. As another example, the hydraulic pressure generated by the first hydraulic pressure supply device 161 may be provided to the wheel cylinder 3 via the inlet valve 113.

The brake control apparatus 100 may determine whether the gear position of the transmission 22 is changed (1030).

The controller 120 may receive information about the gear position of the transmission 22 from the TCU 21 through the CAN transceiver 123.

When it is determined that the gear position of the transmission 22 has not changed (NO in 1030), the brake control apparatus 100 may repeat the determination of whether or not the gear position of the transmission 22 is changed.

When it is determined that the gear position of the transmission 22 has changed (YES in 1030), the brake control apparatus 100 may maintain the hydraulic pressure of the wheel cylinder 3 or the hydraulic circuits 110a and 110b for the first reference time (1040).

For example, when the driver changes the shift lever from the parking position P to the driving position D, the transmission 22 may continuously change the gear position from the parking position P to the reverse position R, from the reverse position R to the neutral position N, and from the neutral position N to the driving position D. In addition, the TCU 21 may transmit information about the change of the gear position of the transmission 22 through the communication network NT.

The controller 120 may obtain the information about the change in the gear position of the transmission 22 through the CAN transceiver 123 and determine the change in the gear position. In response to the change of the gear position, The controller 120 may control the drive motor 150 and/or the valve block 170 to maintain the hydraulic pressure of the wheel cylinder 3 or the hydraulic circuits 110a and 110b for the first reference time after the change of the gear position.

For example, the controller 120 may close the inlet valve 113 and the outlet valve 114 to maintain the hydraulic pressure of the wheel cylinder 3. As another example, the controller 120 may control the first hydraulic pressure supply device 161 or the second hydraulic pressure supply device 162 to maintain the hydraulic pressure of the wheel cylinder 3 or the hydraulic circuits 110a and 110b.

The brake control apparatus 100 may determine whether the elapsed time after the gear position is changed is greater than or equal to the first reference time (1050).

The controller 120 may include a counter, and may use the counter to count the time elapsed since the gear position is changed. In other words, the controller 120 may count the elapsed time after maintaining the hydraulic pressure of the wheel cylinder 3.

The controller 120 may compare the elapsed time after the gear position is changed with the first reference time, and may determine whether the elapsed time after the gear position is changed is greater than or equal to the first reference time based on the comparison result.

The first reference time may be set experimentally or empirically. The first reference time may be set longer than the delay time of changing the gear position of the transmission 22, for example.

When the elapsed time after the gear position is changed is not more than the first reference time (NO in 1050), the brake control apparatus 100 may repeat determining whether the gear position is changed.

When it is determined that the gear position has changed while the time that has elapsed since the gear position is changed is not more than the first reference time, the controller 120 may initialize the time that has elapsed since the gear position is changed, and may count the elapsed time again.

Therefore, when the gear position is continuously changed from the parking position P to the reverse position R, from the reverse position R to the neutral position N, and from the neutral position N to the driving position D, the maintenance of the hydraulic pressure of the wheel cylinder 3 may be continued.

When the elapsed time after the gear position is changed is greater than or equal to the first reference time (YES in 1050), the brake control apparatus 100 may control the hydraulic pressure of the wheel cylinder 3 or the hydraulic circuits 110a and 110b based on the output signal of the brake pedal sensor 130 (1060).

According to the driver's manipulation of the brake pedal 101, the controller 120 may control the drive motor 150 and/or the valve block 170 to adjust the hydraulic pressure of the wheel cylinder 3.

For example, when the position of the brake pedal 101 is changed to the reference position during the first reference time, the controller 120 may open the outlet valve 114 to discharge the hydraulic pressure of the wheel cylinder 3. As another example, the controller 120 may control the hydraulic pressure supply devices 161 and 162 to discharge the hydraulic pressure of the wheel cylinder 3 or the hydraulic circuits 110a and 110b.

Figure 14:
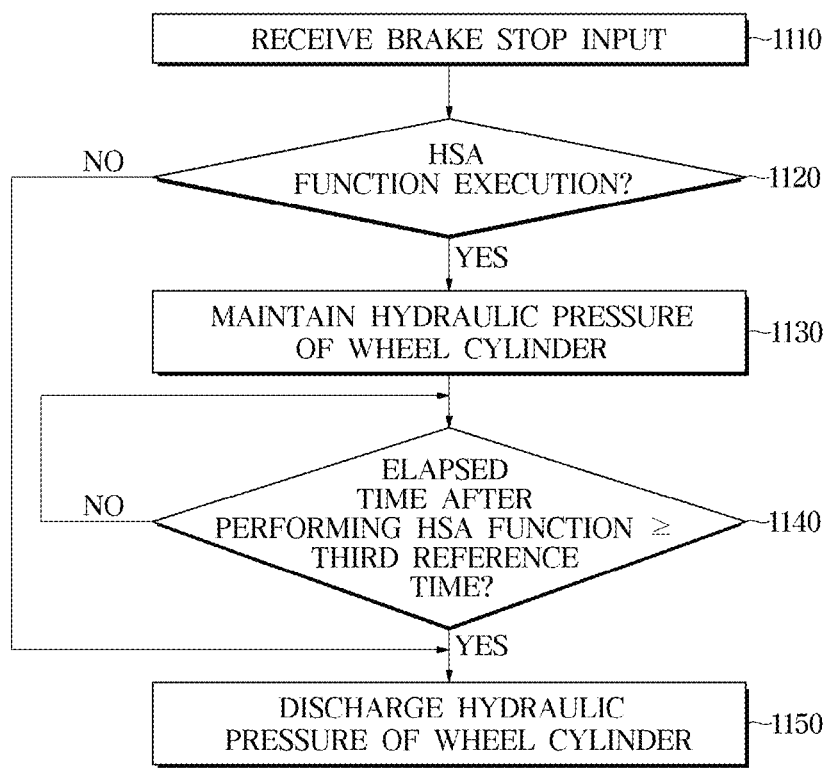
FIG. 14 is a view illustrating a hill start assist (HSA) operation of a brake control apparatus according to an embodiment.

FIG. 14 is a view illustrating a hill start assist (HSA) operation of a brake control apparatus according to an embodiment.

Together with FIG. 14, a HSA operation 1100 of the brake control apparatus 100 is described.

The brake control apparatus 100 may receive a brake stop input from the driver (1110).

The brake control apparatus 100 may obtain the driver's braking stop input through the brake pedal 101.

The brake pedal sensor 130 may detect the movement of the brake pedal 101 (e.g., displacement and movement speed of the brake pedal, etc.), and may output information about the movement of the brake pedal 101 to the controller 120.

The controller 120 may determine that the brake pedal 101 is located at the reference position.

The brake control apparatus 100 may determine whether to perform the HSA function (1120).

The controller 120 may process the output of the gravity sensor to determine whether the vehicle 1 is stopped on the inclined road, determine whether the gear position is the driving position D, and may determine whether the brake pedal 101 is located at the reference position.

When a condition for performing the HSA function is satisfied (YES in 1120), the brake control apparatus 100 may maintain the hydraulic pressure of the wheel cylinder 3 (1130).

When the vehicle 1 is stopped on the inclined road, the gear position is the driving position D, and the brake pedal 101 is located at the reference position, the brake control apparatus 100 may perform the HSA function.

The brake control apparatus 100 may determine whether the elapsed time after performing the HSA function is greater than or equal to the third reference time (1140).

The controller 120 may include the counter, and may count the elapsed time after performing the HSA function using the counter.

The controller 120 may compare the time elapsed after performing the HSA function with the third reference time, and determine whether the time elapsed after the gear position is changed is greater than or equal to the third reference time based on the comparison result.

When the elapsed time after performing the HSA function is not more than the third reference time (NO in 1140), the brake control apparatus 100 may continue to maintain the hydraulic pressure of the wheel cylinder 3.

When the elapsed time after performing the HSA function is greater than or equal to the third reference time (YES in 1140), the brake control apparatus 100 may discharge the hydraulic pressure of the wheel cylinder 3 (1150).

The controller 120 may control the drive motor 150 and/or the valve block 170 to discharge the hydraulic pressure of the wheel cylinder 3 in order to drive the vehicle 1 while the gear position is the driving position D.

When the condition for performing the HSA function is not satisfied (NO in 1070), the brake control apparatus 100 may discharge the hydraulic pressure of the wheel cylinder 3 (1100).

As described above, the brake control apparatus 100 may maintain the hydraulic pressure of the wheel cylinder 3 and the hydraulic circuits 110a and 110b for a predetermined time whenever the gear position of the transmission 22 is changed.

Thereby, an impact may be prevented from being transmitted to the driver due to the delay in the change of the gear position. In addition, it may be prevented that the HSA function is not properly executed due to the delay in the change of the gear position.

According to the embodiments of the disclosure, it is possible to provide the brake control apparatus capable of maintaining the braking of the vehicle for the predetermined time in response to the change in the position of the transmission gear, and the method of controlling the brake control apparatus.

Thereby, it is possible to provide the brake control apparatus capable of braking the vehicle or maintaining the braking regardless of the transmission response speed, and the method of controlling the brake control apparatus. In addition, when the position of the gear is changed, the impact of the vehicle may be prevented, and deterioration of a function of maintaining the vehicle stop may be prevented.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A brake control apparatus comprising:
   a hydraulic pressure supply device configured to provide a hydraulic pressure to a wheel cylinder of a vehicle;
   a flow path extending from the hydraulic pressure supply device to the wheel cylinder;
   at least one valve configured to open or close the flow path; and a controller electrically connected to the hydraulic pressure supply device and the at least one valve,
wherein the controller is configured to:
control the hydraulic pressure supply device to supply the hydraulic pressure to the wheel cylinder through the flow path, and
in response to a change in a gear position of a transmission of the vehicle, control at least one of the hydraulic pressure supply device and the at least one valve to maintain the hydraulic pressure of the wheel cylinder or a hydraulic pressure of the flow path for a first reference time after the change in the gear position.

2. The brake control apparatus according to claim 1, wherein:
the at least one valve comprises an inlet valve configured to open or close the flow path extending from the hydraulic pressure supply device to the wheel cylinder; and
the controller is configured to close the inlet valve for the first reference time to maintain the hydraulic pressure of the wheel cylinder.

3. The brake control apparatus according to claim 1, wherein the controller is configured to operate the hydraulic pressure supply device for the first reference time to maintain the hydraulic pressure of the flow path.

4. The brake control apparatus according to claim 1, wherein, in response to an additional change in the gear position of the transmission within the first reference time after the change in the gear position, the controller is configured to maintain the hydraulic pressure of the wheel cylinder or the hydraulic pressure of the flow path for the first reference time after the additional change in the gear position.

5. The brake control apparatus according to claim 1, wherein:
the gear position of the transmission is configured to be sequentially changed in an order of a parking position, a reverse position, a neutral position, and a driving position; and
the controller is configured to maintain the hydraulic pressure of the wheel cylinder or the hydraulic pressure of the flow path for the first reference time whenever the gear position of the transmission is changed.

6. The brake control apparatus according to claim 1, wherein the controller is configured to maintain the hydraulic pressure of the wheel cylinder or the hydraulic pressure of the flow path without discharging the hydraulic pressure of the wheel cylinder or the hydraulic pressure of the flow path even if a position of a brake pedal of the vehicle is in a reference position for the first reference time after the change in the gear position.

7. The brake control apparatus according to claim 1, wherein the controller is configured to control the at least one of the hydraulic pressure supply device and the at least one valve to discharge the hydraulic pressure of the wheel cylinder or the hydraulic pressure of the flow path based on a passage of the first reference time after the change in the gear position.

8. The brake control apparatus according to claim 1, wherein, based on the gear position being in a driving state and a position of a brake pedal of the vehicle being in a reference position after the first reference time has elapsed, the controller is configured to maintain the hydraulic pressure of the wheel cylinder or the hydraulic pressure of the flow path for a second reference time.

9. A method of controlling a brake control apparatus, the brake control apparatus configured to supply a hydraulic pressure for braking to a wheel cylinder of a vehicle through a flow path, the method comprising:
providing, by a hydraulic pressure supply device, the hydraulic pressure to the wheel cylinder;
receiving, by a controller, information about a gear position of a transmission of the vehicle; and
in response to a change in the gear position of the transmission, maintaining, by the controller, the hydraulic pressure of the wheel cylinder or a hydraulic pressure of the flow path for a first reference time after the change in the gear position.

10. The method according to claim 9, wherein the maintaining of the hydraulic pressure of the wheel cylinder comprises:
closing an inlet valve, the inlet valve being configured to open or close the flow path for supplying the hydraulic pressure to the wheel cylinder.

11. The method according to claim 9, wherein the maintaining of the hydraulic pressure of the wheel cylinder comprises:
maintaining the hydraulic pressure generated by operating the hydraulic pressure supply device.

12. The method according to claim 9, further comprising:
in response to an additional change in the gear position of the transmission within the first reference time after the change in the gear position, maintaining, by the controller, the hydraulic pressure of the wheel cylinder for the first reference time after the additional change in the gear position.

13. The method according to claim 9, further comprising:
in response to the gear position of the transmission being sequentially changed in an order of a parking position, a reverse position, a neutral position, and a driving position, maintaining, by the controller, the hydraulic pressure of the wheel cylinder for the first reference time whenever the gear position of the transmission is changed.

14. The method according to claim 9, further comprising:
maintaining, by the controller, the hydraulic pressure of the wheel cylinder or the hydraulic pressure of a flow path without discharging the hydraulic pressure of the wheel cylinder even if a position of a brake pedal of the vehicle is in a reference position for the first reference time after the change in the gear position.

15. The method according to claim 9, further comprising:
discharging, by the controller, the hydraulic pressure of the wheel cylinder or the hydraulic pressure of a flow path based on a passage of the first reference time after the change in the gear position.

16. The method according to claim 9, further comprising:
based on the gear position being in a driving state and a position of a brake pedal of the vehicle being in a reference position after the first reference time has elapsed, maintaining, by the controller, the hydraulic pressure of the wheel cylinder for a second reference time.

17. A brake control apparatus comprising:
a hydraulic pressure supply device configured to provide a hydraulic pressure to a wheel cylinder of a vehicle;
a flow path extending from the hydraulic pressure supply device to the wheel cylinder;
at least one valve configured to open or close the flow path; and
a controller electrically connected to the hydraulic pressure supply device and the at least one valve, wherein the controller is configured to:
receive information about a lever position of a shift lever of the vehicle, and
in response to a change in the lever position of the shift lever, control at least one of the hydraulic pressure supply device and the at least one valve to maintain the hydraulic pressure of the wheel cylinder or a hydraulic pressure of the flow path for a third reference time after the change in the lever position.

18. The brake control apparatus according to claim 17, wherein:
the at least one valve comprises an inlet valve configured to open or close the flow path extending from the hydraulic pressure supply device to the wheel cylinder; and
the controller is configured to close the inlet valve for the third reference time to maintain the hydraulic pressure of the wheel cylinder.

19. The brake control apparatus according to claim 17, wherein the controller is configured to operate the hydraulic pressure supply device for the third reference time to maintain the hydraulic pressure of the flow path.

20. The brake control apparatus according to claim 17, wherein the controller is configured to control the at least one of the hydraulic pressure supply device and the at least one valve to discharge the hydraulic pressure of the wheel cylinder or the hydraulic pressure of the flow path based on a passage of the third reference time after the change in the lever position.

* * * * *